United States Patent
Nonaka (10) Patent No.: US 8,725,399 B2
(45) Date of Patent: May 13, 2014

(54) MAP DISPLAY SYSTEM AND MAP DISPLAY METHOD

(75) Inventor: Osamu Nonaka, Sagamihara (JP)

(73) Assignees: Olympus Imaging Corp., Tokyo (JP); Olympus Corporation, Tokyo (JP)

( * ) Notice: Subject to any disclaimer, the term of this patent is extended or adjusted under 35 U.S.C. 154(b) by 986 days.

(21) Appl. No.: 12/250,621

(22) Filed: Oct. 14, 2008

(65) Prior Publication Data

US 2009/0105945 A1    Apr. 23, 2009

(30) Foreign Application Priority Data

Oct. 17, 2007 (JP) ................................. 2007-269777

(51) Int. Cl.
    *G06Q 10/00*    (2012.01)
(52) U.S. Cl.
    USPC .......................................... 701/200; 701/420
(58) Field of Classification Search
    USPC ........................................................ 701/200
    See application file for complete search history.

(56) References Cited

U.S. PATENT DOCUMENTS

| 6,202,025 B1 * | 3/2001 | Harada ..................... 340/995.18 |
| 6,263,276 B1 * | 7/2001 | Yokoyama et al. ........... 701/420 |
| 2002/0143462 A1 * | 10/2002 | Warren ......................... 701/200 |

FOREIGN PATENT DOCUMENTS

JP    2007-052809    3/2007

\* cited by examiner

*Primary Examiner* — Tran Nguyen
*Assistant Examiner* — Rajiv Raj
(74) *Attorney, Agent, or Firm* — John C. Pokotylo; Straub & Pokotylo (57) ABSTRACT

A map display system according to the present invention includes: a search section searching for a reference point where a map has not changed for approximately the same period as a period during which a map or a landscape of a base point has not changed; and a display section displaying information which represents the searched reference point. Further, a map display method according to the present invention includes: searching for a reference point where a map has not changed for approximately the same period as a period during which a map or a landscape of a base point has not changed; and displaying information which represents the searched reference point.

18 Claims, 6 Drawing Sheets

(a) 2007 — position B, change small 1, change small 2, change small 3

(b) 1997 — change small 1, change small 2, change small 3

(c) 1987 — change small 1, change small 2

(d) 1977 — change small 1

MAP DISPLAY SYSTEM AND MAP DISPLAY METHOD

Benefit is claimed, under 35 U.S.C. § 119, to the filing date of prior Japanese Patent Application No. 2007-269777 filed on Oct. 17, 2007. This application is expressly incorporated herein by reference. The scope of the present invention is not limited to any requirements of the specific embodiments described in the application.

BACKGROUND OF THE INVENTION

1. Field of the Invention

The present invention relates to a map display system and a map display method, and, in more detail, relates to a map display system and a map display method which are convenient when searching for an aged building or street.

2. Description of the Related Art

The recent development of the IT technology surrounding digital cameras has been allowing the camera to output digitalized images to the outside via the Internet or the like, and also to acquire images such as a map from the outside for utilizing the images for various applications.

As an application method of a combination of a map and an image, Japanese Unexamined Patent Application Publication No. 2007-52809 (published on Mar. 1, 2007) discloses a photograph providing system which displays a photograph on a map and also displays a shooting position and a shooting direction of the photograph.

SUMMARY OF THE INVENTION

An object of the present invention is to provide a map display system and a map display method capable of searching for an aged building or street easily.

A map display system according to the present invention includes: a search section searching for a reference point on a map where the map has not changed for a given period; and a display section displaying information which represents the searched reference point.

A map display method according to the present invention includes the steps of: searching for a reference point where a map has not changed for approximately the same period as a period during which a map or a landscape of a base point has not changed; and displaying information which represents this searched reference point.

A map display method in a mobile device according to the present invention includes the steps of: transmitting at least one of a reference image representing a landscape of a base point and positional information of the base point; receiving a search result of a reference point where a map has not changed for approximately the same period as a period during which the base point has not changed; and displaying information which represents the searched reference point.

A server according to the present invention includes: a search section inputting information regarding a base point and searching for a reference point where a map has not changed for approximately the same period as a period during which a map or a landscape of the base point has not changed; and an output section outputting information which represents the searched reference point.

A computer-readable medium storing a computer program according to the present invention stores the computer program causing a computer device to execute a map display method including the steps of: searching for a reference point where a map has not changed for approximately the same period as a period during which a map or a landscape of a base point has not changed; and displaying information which represents this searched reference point.

DETAILED DESCRIPTION OF THE PREFERRED EMBODIMENTS

Figure 1:
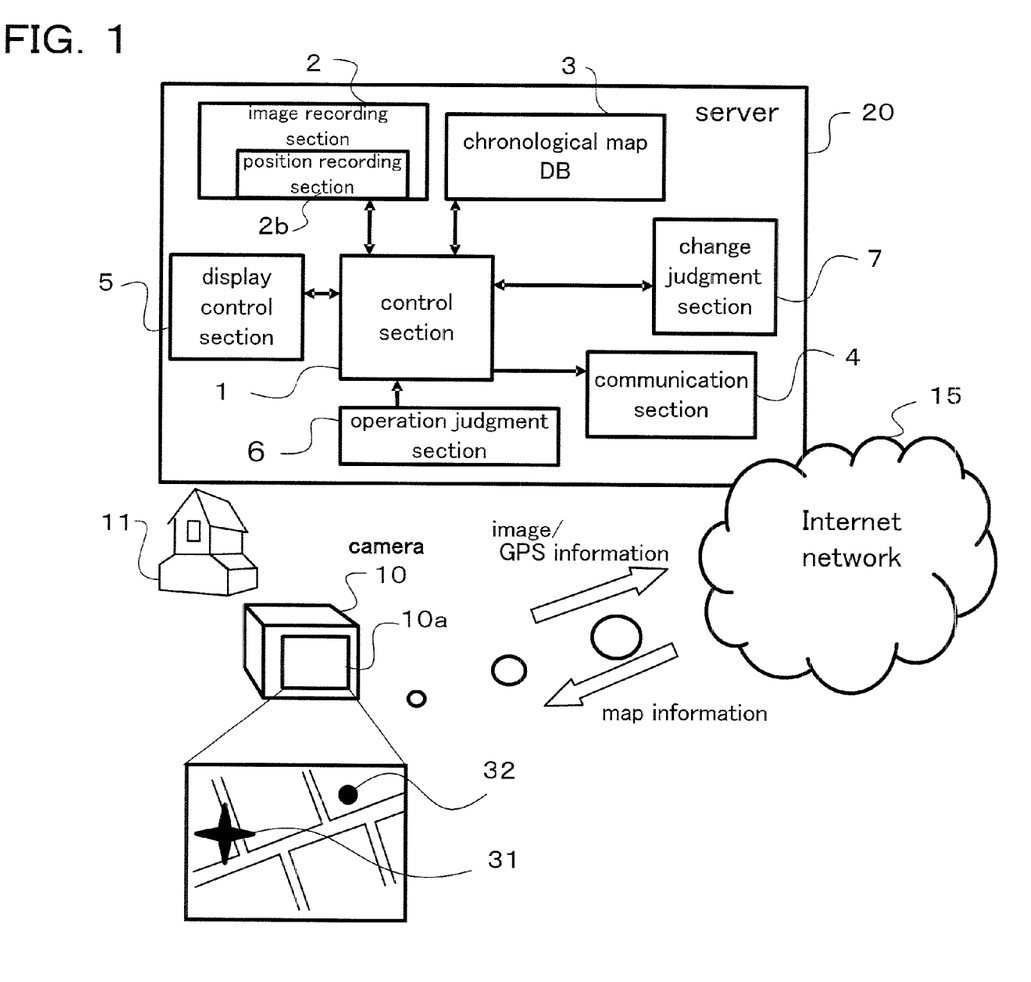
FIG. 1 is a block diagram showing a map display system according to an embodiment of the present invention.

Hereinafter, preferable embodiments will be described, using a map display system to which the present invention is applied, with reference to the drawings. FIG. 1 is a block diagram showing a configuration of a map display system according to an embodiment of the present invention. The map display system according to the present invention includes a camera 10 and a server 20 which is connected to the camera 10 via the Internet network 15 or the like. While the camera 10 obviously may contain a function equivalent to that of the server 20, a system realized more easily will be described here. The camera 10 is a digital camera and can convert an object image into image data and record the image data into a recording medium. The image data recorded in the recording medium can be displayed on a display section 10a when reproduction thereof is instructed by a reproduction button or the like.

Further, the camera 10 contains the GPS (Global Positioning System) for acquiring positional information. The positional information of a shooting position is recorded in the recording medium together with the image data. Still further, the camera 10 includes a transmission section and a reception section for communicating with the server 20 via the Internet network 15. The camera 10 can transmit the image data together with the positional information from the transmission section to the server 20.

Moreover, the camera 10 can receive map image information, which has been processed by the server 20, or the like. This map image information can be displayed on the display section 10a. Note that, while the camera 10 contains the GPS for acquiring the positional information in the present embodiment, the camera 10 is not limited to this configuration. For example, the camera 10 may instead acquire the positional information utilizing a base station of a mobile phone system, or may detect the positional information utilizing a hot spot or the like. Further, the camera 10 may acquire the positional information or a map by a manual input of a place name, an address, a building name, or the like.

The server 20 can be connected to the Internet network 15 and can record received images such as a photograph. Further, the server 20 can receive an operation instruction from a user's personal computer (hereinafter, called PC), read a recorded image according to this operation instruction, and transmit the image to the user's PC to display the image on a display section of the PC. The server 20 includes, as shown in FIG. 1, a control section 1, an image recording section 2, a position recording section 2b, a chronological map DB (database) 3, a communication section 4, a display control section 5, an operation judgment section 6, and a change judgment section 7.

The control section 1 is connected with each of the sections in the server 20, and receives an image from the user's PC, the camera 10, or the like and performs preservation or transmission of this image. Further, the control section 1 performs the control operation of each of the sections in the server 20 such as transmission of the map information, which represents a position without change on a map, or the like, in response to a request from the user's PC, the camera 10, or the like. The image recording section 2 records the image transmitted from the user's PC, the camera 10, or the like. The position recording section 2b records the positional information of the image attached to the image to be recorded in the image recording section 2.

The chronological map DB 3 is a database recording maps of respective years. The server 20, other than including this chronological map DB 3 therein, may utilize an external database by a connection to a chronological map DB in an external database via the Internet network 15 or the like.

Further, the chronological map DB 3 may store an aerial photograph in addition to a map and store the map and the aerial photograph in association with each other. Thereby, when a building has been renamed on a map but does not change an appearance thereof on an aerial photograph, it is possible to determine that the building has not changed. The map and the aerial photograph are associated with each other such that a particular base point is marked on both of the map and the aerial photograph and a position on the map can be estimated also on the aerial photograph, for example.

The communication section 4 performs transmission and reception of information to and from the external PC, the camera 10, or the like via the Internet network 15. The display control section 5 is a control section to enable the external PC, the camera 10, or the like to display an image recorded in the server 20 or generated map information. The operation judgment section 6 judges a user's operation status on a keyboard or the like in the external PC, the camera 10, or the like. According to the judgment of this judgment section 6, the control section 1 controls each of the sections in the server 20. The change judgment section 7 searches for map information stored in the chronological map DB 3 and judges a change on a map.

Next, operation of the map display system configured in this manner will be described. First, a user shoots an aged building 11, or the like, as an object using the camera 10, and then the user can transmit this image data and the positional data of the shooting position to the server 20 on a network through the Internet network 15.

The server 20 is connected to the network via the communication section 4, and records the received image data and the positional data into the image recording section 2 and the position recording section 2b, respectively. When a user requests a search for a similar position, the server 20, using the change judgment section 7, compares a display of a shooting position on a map with a display of the same position up to many years ago and judges whether the position has changed from the past or not.

Note that, when the map and the aerial photograph are stored in association with each other in the map DB 3, the server 20 may compare more detail and even specify a building therein reflecting the shot image information. Thereby, it becomes possible to compare the display of the shooting position on the map with the display of the same position up to many years ago and to judge whether the position has not changed from the past or since what era the building has existed, or the like. In this case, images of the map and the photograph cannot be compared directly with each other, and therefore the judgment is performed according to a connection of each road on the map and a connection manner (pattern) of each road on the photograph.

Figure 2:
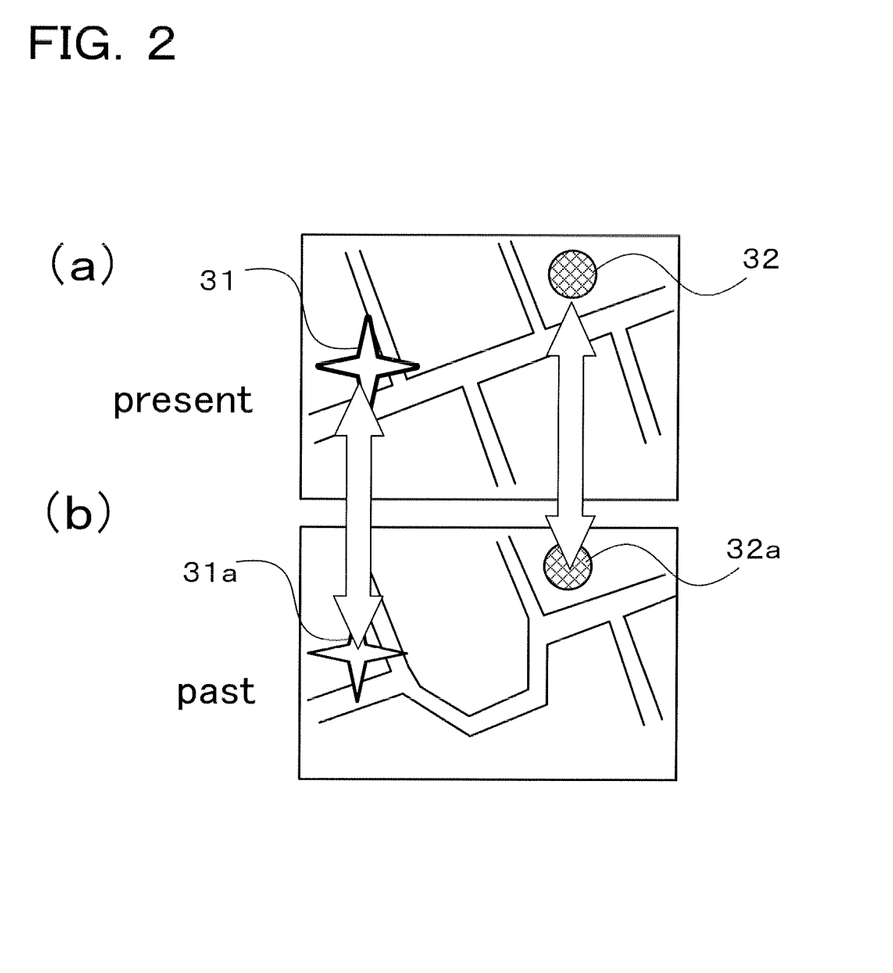
FIG. 2 is a diagram illustrating judgment of a change judgment section in a map display system according to an embodiment of the present invention.

The change judgment section 7 compares the maps and judges what part of the map has changed and what part of the map has not changed, according to information such as whether the geography, a road shape, or a displayed building and a facility has changed or not, as shown in FIG. 2. The example shown in FIG. 1 or FIG. 2 assumes the position 31 denoted by an asterisk to be a present position (base point) and further assumes that this position 31 has not changed since 40 years ago. The change judgment section 7, using this position 31 as a base point, searches for a position (reference point) which has not changed for many years (equivalent to the amount of years since position 31 (base point) has not changed), and displays a position 32 of the "position which has not changed from the past" on the map.

Here, the base point is a position of the building or the like which the user found first and a position where the user feels like finding a similar one, and the reference point is another location which is assumed not to have changed from the past as the base point. The change judgment section 7 searches for the reference point and judges where the reference point is, according to the information of the base point. The user can learn the position (position 32) where the user can shoot a building or street unchanged since many years ago as in the present position 31, and can go there for shooting.

Figure 3:
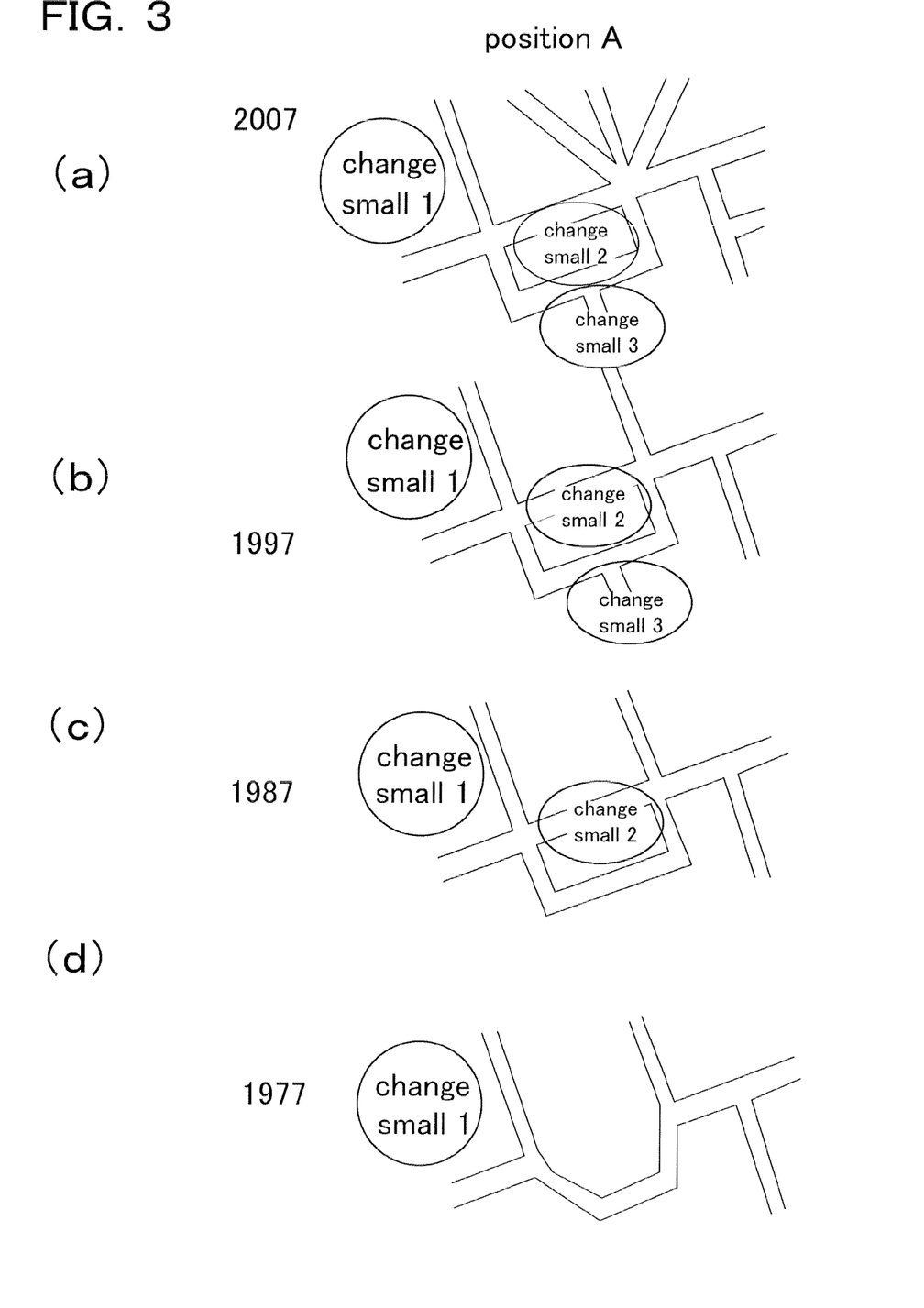
FIG. 3 is a diagram showing a change on a map at position A (position of a reference image) in a map display system according to an embodiment of the present invention.
Figure 4:
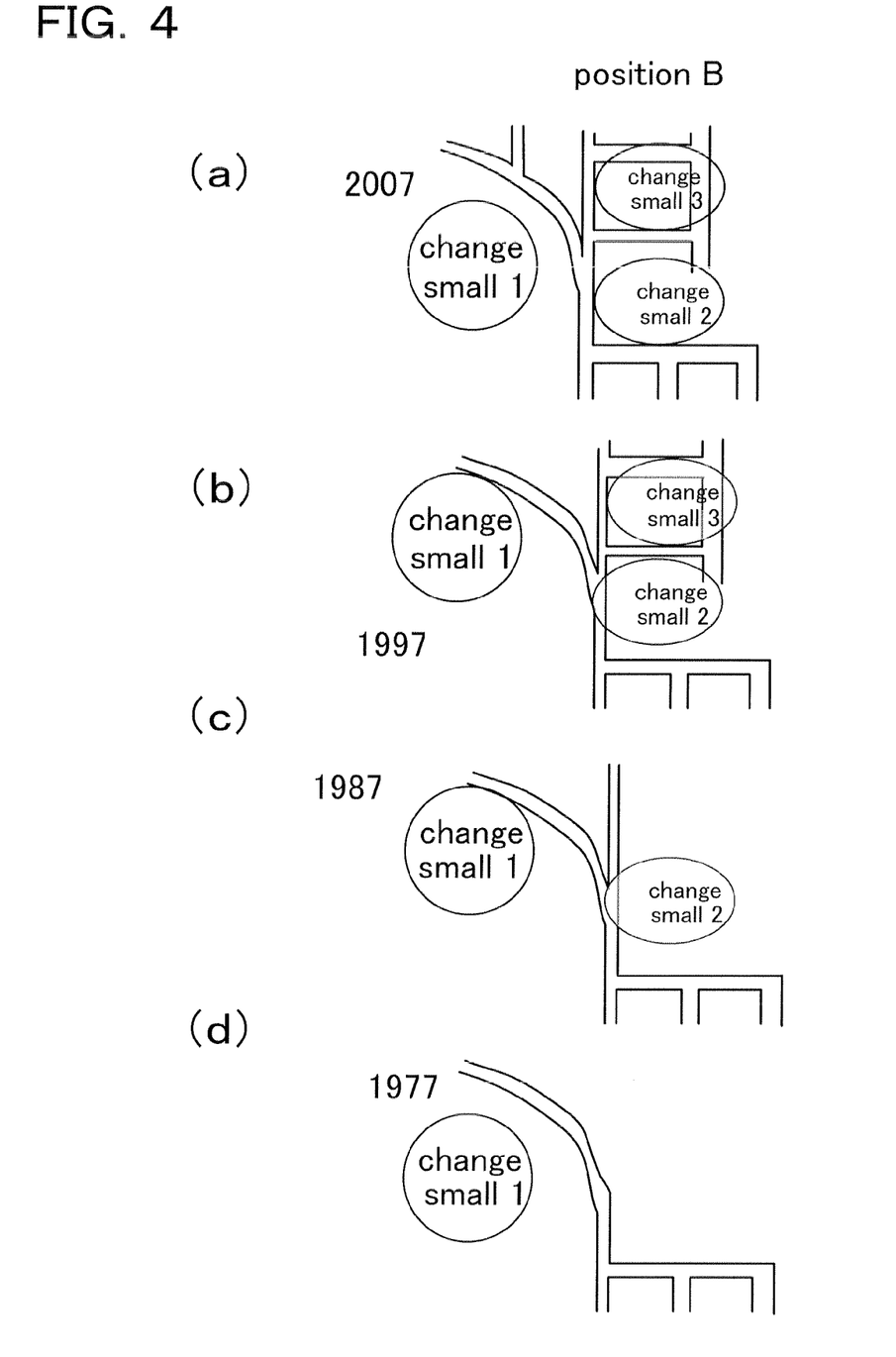
FIG. 4 is a diagram showing a change on a map at position B (present position) in a map display system according to an embodiment of the present invention.

Next, the judgment of the change on a map, performed by the change judgment section 7, will be described with reference to FIG. 3 and FIG. 4. FIG. 3 shows a road network in a present location A for every 10 years from 1977 to 2007, and FIG. 4 shows a road network in a location B different from the location A for every 10 years from 1977 to 2007. Note that FIG. 3 is assumed to be a map corresponding to a position corresponding to a shot image and FIG. 4 is assumed to be a map corresponding to a position where the user is standing presently.

Examination of the maps from 1977 to 2007 shows that the number of roads was small in the past and new roads have been constructed as the area has been developed over time. Further, when the map has an indication of height above sea level, the map can be utilized for judging a change in geography. The change can be classified into a "change small 1" for a position which has not changed since 1977, a "change small 2" for a position which has not changed since 1987, and a "change small 3" for a position which has not changed since 1997.

For such classification, similar judgment can be performed for the position shown in FIG. 3 aid also the position shown in FIG. 4. When the user likes a building which the user has found at a position having the change small 2 on the map shown in FIG. 3, the user is considered to have an interest in buildings popular in this era. Then, if a position classified into the change small 2 is found by search in another area and displayed on the map shown in FIG. 4, for example, it can allow the user to shoot a building of a user's taste there.

For example, when the user searches for an image of a building or the like, which has a historical background as a cultural heritage remaining in Tokyo, in the present Kanagawa, FIG. 3 corresponds to Tokyo and FIG. 4 corresponds to Kanagawa. The map shown in FIG. 4 is assumed to be a map of a position where the user has transmitted an image for the search. While the search is performed at a 10-year span in the present embodiment, the search can be performed at a 100-year span depending on an area. For example, the span for the judgment may be longer in an older era, and, since an old map is different from the present map in a drawing method, the comparison may be performed by using a name of a building and an arrangement of the building. Thereby, it becomes possible to display on a map where to go to watch a building having the same architectural style.

By displaying the maps of FIG. 3 and FIG. 4 at the same time and displaying the maps in colors classified according to the classified "change", it is possible to watch the display while easily comparing the maps with each other in searching for where a similar building or street, or the like is. While such an image can be watched on a display of a PC or a mobile phone, the image additionally may be downloaded into the camera, for example. By displaying these data on the display section 10a of the camera 10, it is possible to enjoy a walk in a town while carrying the camera 10, searching as needed, and watching the display section 10a.

Note that, in addition to the image shot by the camera 10, the user obviously may utilize an image found in the PC or the like, for example, and may search for a similar building in a position close to a position where the user lives. Further, the search or the like may be performed by the PC and only a result of the search may be input into the camera 10.

In this manner, the map judgment section 7 of the present embodiment can find a building, a street, or the like, similar to those which a user likes, in a user's own backyard, and the user can enjoy shooting of these buildings and streets. Note that the present embodiment can be applied to searching for a position which has a similar change on a map, when the user shoots not only the street but also an animal or a plant. For example, the search can be performed utilizing information that there is a good possibility of a fish, a kind of fish endemic to the area, living in an old pond and, on the other hand, there is little possibility of such a fish living in a newly made pond.

Figure 5:
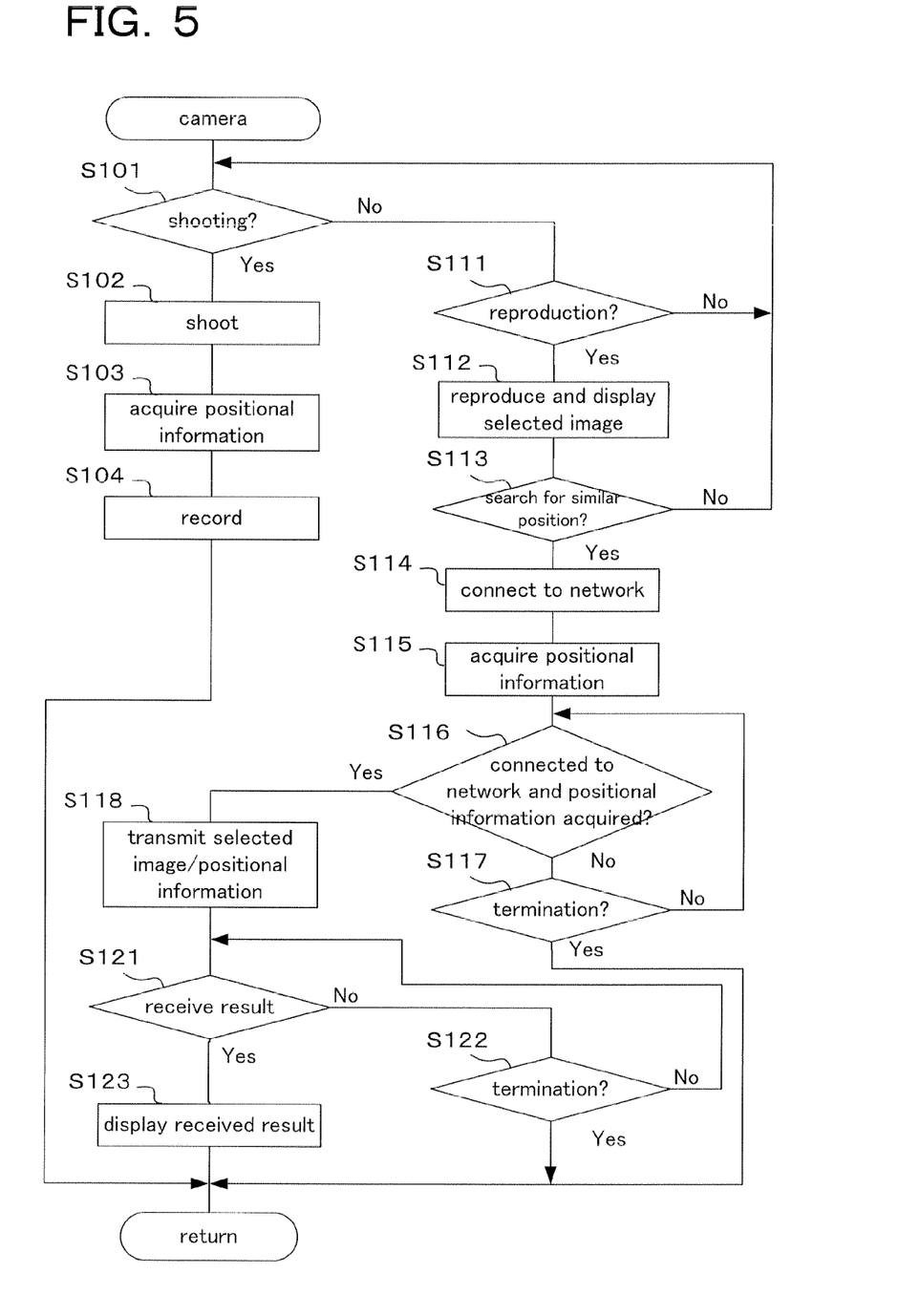
FIG. 5 is a flowchart showing operation of a camera in a map display system according to an embodiment of the present invention.

Next, operation of the camera 10 will be described using the flowchart shown in FIG. 5. First, when the camera 10 starts to operate, the camera 10 determines whether the shooting operation is instructed or not (S101). The determination of whether the shooting operation is instructed or not is performed by determining whether a release button or the like of the camera is operated or not. If the shooting operation is instructed in the determination result, the camera 10 performs shooting (S102). In this shooting, an image sensor in the camera 10 acquires image data from an object image.

Subsequently, the camera 10 acquires the positional information of a shooting position (S103). The positional information is acquired by the built-in GPS. When the camera 10 is connected to the network via the hot spot, for example, the camera 10 may acquire the positional information from there rather than acquiring it from the GPS. Further, when the camera 10 can not detect the position thereof, the camera 10 may acquire the positional information of the shooting from a connection point of a mobile phone or the like carried by the user. After having acquired the positional information, the camera 10 subsequently records the image data together with this positional information into the recording medium (S104). When the recording has been completed, the camera 10 returns to the initial step.

If the shooting is not instructed in the determination result in Step S101, the camera 10 determines next whether reproduction is instructed or not (S111). The reproduction mode is a mode to reproduce and display the image data recorded in the camera 10 on the display section 10a. The camera 10 in this step determines whether or not the reproduction is instructed by the operation of the reproduction button provided to the camera 10. If the reproduction is not instructed in the determination result, the camera 10 returns to Step S101.

On the other hand, if the reproduction is instructed in the determination result of Step S111, the camera 10 performs the reproduction display of the image selected by the user (S112). Subsequently, the camera 10 determines whether or not to perform the search for a similar position (S113). This search for a similar position is a search for finding a similar position on a map by judging a change on the map in the change judgment section 7 as described with reference FIG. 2 to FIG. 4. When the user requests the search for a similar position, the user instructs this search in a menu mode of the camera 10, and the camera 10 determines in this step whether the search for a similar position is instructed or not.

While the camera 10 can search for a similar position of the reproduced image (reference image) by the user's operation to instruct the search for a similar position, the image used for the search here may be an image shot by another person, not limited to an image shot by the user himself or herself, and further may be an image retrieved from the Internet or the like. In this case, the image is imported into the camera 10. The configuration to perform the search for a similar position using the reference image retrieved on the Internet or the like realizes a wider range of application thereof such as a search for a position which has experienced a historical change in the same condition as that of the reference image. That is, this function is useful when the user wants to shoot a building or the like similar to a building or the like which the user has found on the PC.

If the search for a similar position is not instructed in the determination result of Step S113, the camera 10 returns to Step 101 and performs the above described step. On the other hand, if the search for a similar position is instructed in the determination result, the camera 10 is connected to the Internet network 15 (S114).

Next, the camera 10 acquires the positional information of the connection position thereof (S115). The positional information may be acquired by utilizing the built-in GPS of the camera 10 and also may be acquired from the connection point when the camera 10 is connected to the network via a wireless LAN from the hot spot or the like. This is because the location of the hot spot can be determined by the server 20. Further the user may input the positional information by manually instructing it on a map displayed in the camera. In these cases, the camera 10 does not need to incorporate the GPS or the like.

Subsequently, the camera 10 determines whether or not the camera 10 is connected to the network and can acquire the positional information correctly (whether OK or not) (S116). If the camera 10 is not connected to the network or can not acquire the positional information, that is, if not OK, in the determination result, the camera 10 determines whether to terminate the search for a similar position (S117). When the user selects the termination of the search mode for a similar position and operates the camera 10 for the termination, the camera 10 determines whether the termination operation has been performed by the user or not.

If the search for a similar position is not terminated in the determination result of Step S117, the camera 10 returns to Step S116 and performs the above described step, and, on the other hand, if the search for a similar position is terminated in the determination result, the camera 10 returns to the initial step.

If OK in the determination result of Step S116, the camera 10 transmits the selected image (reference image) and the positional information to the server 20 via the Internet network 15 (S118). Note that, if OK in Step S116, the camera 10 may display the fact of the determination result in Step S116 on the display section 10a. The server 20, according to the selected image (reference image) and the positional information, searches for a position where an image similar to the selected image can be obtained, in an area close to the present position of the user, using the chronological DB 3. The detail of this search will be described hereinafter with reference to FIG. 6.

The camera 10 waits for a response from the server 20 after having transmitted the selected image (reference image) and the positional information (S121), and, if the response is not obtained, the camera 10 determines whether to terminate the process or not, as in Step S117 (S122). If the process is not terminated in the determination result, the camera 10 returns to Step S121, and, on the other hand, if the process is terminated, the camera 10 returns to the initial step.

When the camera 10 receives the search result from the server 20 in Step S121, the camera 10 displays the search result (S123). That is, the server 20 transmits a position, where the similar image can be shot, together with a map as shown in FIG. 2A, and the camera 10 displays the position and map on the display section 10a. Note that the server 20 may transmit information such as a combination of FIG. 2A and FIG. 2B, only FIG. 4, and both of FIG. 3 and FIG. 4.

In this manner, the camera 10 of the present invention has a function to transmit the image data accompanying the positional information, a function to receive the result transmitted from the server 20, a function to acquire the positional information when the camera 10 transmits the image data, etc. By utilizing these functions, the camera 10 can receive a position where an image similar to the image data can be shot, and can display the position on the display section 10a.

Figure 6:
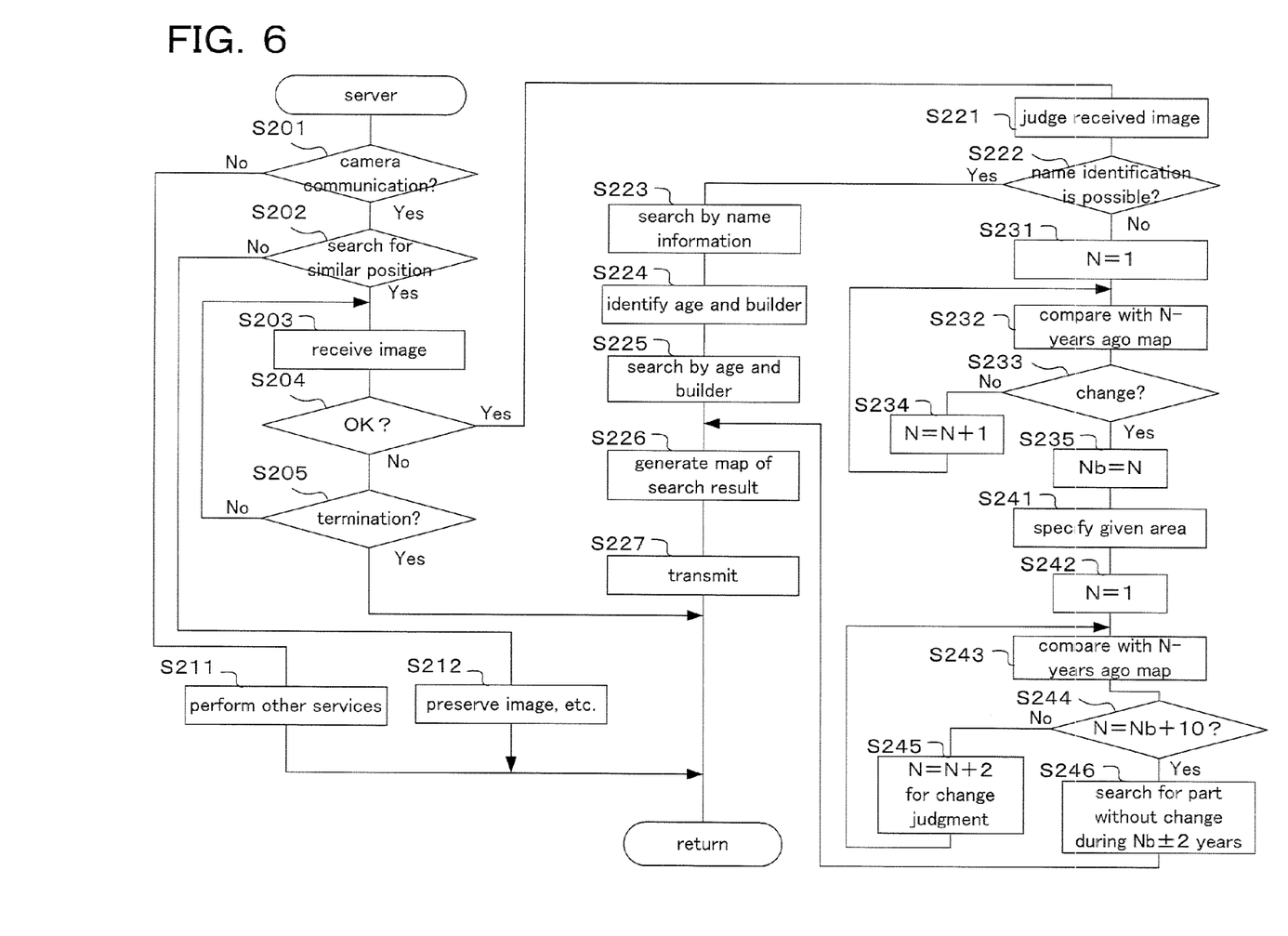
FIG. 6 is a flowchart showing operation of a server in a map display system according to an embodiment of the present invention.

Next, operation of the server 20 will be described using the flowchart shown in FIG. 6. This server 20 searches for a position, where a similar object can be found, using the positional information or the image transmitted from the camera 10 and generates a map image of the position. First, when the server 20 starts to operate, the server 20 determines whether or not the server 20 has communication with the camera 10 (S201).

If the server 20 has communication with the camera 10 in the determination result of Step S201, the server 20 subsequently determines whether the search for a similar position is requested or not according to a content of the communication (S202). If the search for a similar position is requested in the determination result, the server 20 receives the image data from the camera 10 (S203). Note that the server 20 additionally receives the positional information of a position where the camera 10 has performed the transmitting operation, when receiving the image.

Subsequently, the server 20 determines whether the server 20 can receive the image or the like appropriately or not, that is, whether OK or not (S204). If not OK in the determination result, the server 20 determines whether the search for a similar position is terminated or not (S205). If the search for a similar position is not terminated, that is, when the server 20 continues the search, the server 20 returns to Step S203, and, on the other hand, if the search for a similar position is terminated, the server 20 returns to the initial step.

If the server 20 does not have communication with the camera 10 in the determination result of Step S201, the server 20 performs the other typical services of the server 20 such as receiving and preserving images according to the operation of the user's PC or controlling the preserved images to be displayed for browsing, for example (S211). Further, if the search for a similar position is not requested in the determination result of Step S202, the server 20 performs an operation of preserving the image transmitted from the camera 10 or the like (S212). After having finished the processes in Step S211 and Step S212, the server 20 returns to the initial step.

If the image is received successfully (if OK) in Step S204, the server 20 judges an image characteristic of the received image (S221). According to the result of this judgment, the server 20 determines whether a name can be identified or not (S222). That is, when the image has a definite unique shape such as the shape of Tokyo Tower or Kinkakuji, at least the name thereof can be identified, and the server 20 determines whether the received image is such an image or not.

If the name can be identified in the determination result of Step S222, the server 20 performs the search using a natural language of the name information (S223). According to this search result, the server 20 identifies an age or a builder of a building (S224). Then, the server 20 searches for a building or the like built in the same era or by the same builder in another location (S225). In this case, the server 20 may have a function such as that of a dictionary and may search for information stored in an other server.

After that, according to the search result, the server 20 generates a map of an area close to the position, where the user has performed the transmission operation, received in Step S203 (S226), and transmits information of the generated map to the camera 10 (S227). Thereby, the position, which is easily accessible for the user and has a building having the same historical background as the building or the like in the transmitted image or a building built by the same builder as in the transmitted image, is displayed on the map. After the transmission, the server 20 returns to the initial step.

If the name can not be identified in the determination result of Step S222, N is set to be one (N=1) (S231). The case in which the name can not be identified is supposed to be a case such as of a typical street or a shopping mall, etc. The variable N set in Step S231 represents how many years old the map to be searched is. Subsequently, the server 20 compares a map of N years ago and the present map (S 232) with each other, and determines whether there is a change in roads or the like (S233). If there is not a change, the server 20 adds one year to N years and sets N+1 (N=N+1), and returns to Step S232 for comparing the maps.

If there is a change in the determination result of Step S233, the server 20 stores the variable N as Nb (S235). Since the position changed Nb years ago, the server 20 searches for a position likely to have a landscape having remained for Nb years. For finding this location, the server 20 searches for another position having changed Nb years ago. Note that these Nb years may be obtained not by the judgment on the map or the image but by a manual input from the user.

First, in Step S115 (FIG. 5), the server 20 specifies an area close to the position, where the camera 10 acquired the positional information, as a given area (S241). Since there may be many positions which show changes occurred Nb years ago on the map, the given area is determined for searching for a position within or close to the given area by priority.

Note that, other than by this method, the given area obviously may be set by a user's manual operation. When the user wants to perform shooting instantly, it is convenient to set the positional data of the transmission position automatically for the given area. However, when the user goes to some remote place, for example, the user may preliminarily input the given area, and the server 20 may perform the same judgment as in the present embodiment selecting a map.

After having specified the given area in Step S241, the server 20 subsequently initializes the variable N (N=1) (S242). The server 20 compares the present map with the map of N years ago in the position within or close to the given area (S243). Then, the server 20 determines whether the compared age is Nb+10 years old or not (S244). If the compared age is younger than Nb+10 years old in the determination result, the server 20 adds two to N, that is, sets N+2 (N=N+2) (S245). After that, the server 20 returns to Step S243 and compares the maps.

If the compared age reaches Nb+10 years old (N=Nb+10) in the determination result of Step S244, the server 20 searches for a position, which has not changed for a time range of Nb±2 years, according to the map comparison results of Steps S243 to S244 (S246). While an error of about ±30 years may be allowable to a search for an ancient place for every span of 100 years, an allowable error range is set to be ±2 years here assuming a case of searching for an object having a history of several tens of years. The allowable error range may be changed as needed according to an age of an object for the search. That is, accuracy of the age in the change detection may be switched according to the age of the building or the like.

After having completed the search for a position without change, the server 20 generates a map representing the search result (S226), and transmits this information to the camera 10 (S227). After the transmission, the server 20 returns to the initial step. In this manner, a map is displayed representing a position having experienced the same history as a position which has interested a user of the camera, and the user can enjoy more image shooting by finding various locations, which the user wants to shoot, by himself or herself. Further, it is possible to provide a camera system which allows the user to find a location, which the user wants to shoot, in a position near at hand and to enjoy image shooting.

As described hereinabove, the present embodiment searches for the reference point where the map has not changed for approximately the same period as a period during which the map or the landscape of the base point has not changed, and displays the information representing this reference point obtained by the search. That is, the present embodiment searches for the reference point where the map has not changed, according to the transmission position transmitted by the user or by the transmitted image (landscape) (S225 and S246), and generates the map of this reference point (S226). In this manner, the present embodiment can quickly search for a position suitable for sightseeing or image shooting by referring to a change from the past to the present on the map, and can display the position on the present map corresponding to the real landscape. Further, the present embodiment can provide the map display system and the map display method capable of searching for an aged building or street easily.

Note that, while the present embodiment searches for the reference point which has not changed for approximately the same period as the base point according to the information of the base point, a changed state in some area may be obtained without relating to the base point and this area may be displayed as in FIG. 3 or FIG. 4.

Further, while the present embodiment transmits both of the selected image and the positional information in transmitting the information of the base point from the camera 10 to the server 20 (S118), the search for the reference point may be performed only by the positional information. In this case, Steps S222 to S225 are omitted. Further, while the present embodiment judges the change of the map using roads, the change of the map obviously may be judged using a land utilizing state such as a rice field, a fruit garden, and a residential area, or a height above sea level, not limited to the roads.

Still further, as described above, the simple judgment of "the position which has not changed since Nb years ago" may be performed using only the map information. In addition, it is possible to find an application such as one to search for a position, where a pattern of the oldest road remains without change, in a map. The present embodiment can be applied for a case in which a user visits some city for the first time, goes to a position where an old street unique to the area remains, and wants to feel the history of the city. In this case, the user may enable the camera 10 to display a map using the built-in GPS or the like, and to display a position having remained for many years. Further, the map may be displayed by an input of a place name or the like, or the map may be selected among sample maps for a reference. This may satisfy the user's intellectual curiosity.

Moreover, while the camera 10 accesses the server 20 to perform the search for a similar position in the present embodiment, the PC may access the server 20 to perform the search for a similar position. In this case, the PC may perform Step S111 and the following steps in FIG. 5, and the result received in Steps S121 and S123 may be imported into the camera 10 and displayed on the display section 10a of the camera 10.

Moreover, while the present embodiment is described using the digital camera as a mobile device for acquiring image data, the camera may be a digital single-lens reflex camera or a compact digital camera, or obviously may be a camera contained in a mobile phone or a PDA (Personal Digital Assistant).

The present invention is not limited exactly to the embodiments and can be embodied for implementation by modifying the constituents without departing from the spirit of the invention. Further, various inventions can be formed by an appropriate combination of the plurality of constituents disclosed in the foregoing embodiments. For example, some of the entire constituents shown in the embodiments may be omitted. Further, the constituents across the different embodiments may be approximately combined.

What is claimed is:

1. Apparatus comprising:
an input section of a server system for receiving positional information about an item, wherein the item is one of a building, a landmark, or a historically or culturally significant site;
a database of the server system storing a plurality of chronological maps, wherein each of the plurality of chronological maps is associated with a time such that the plurality of chronological maps is collectively associated with a time period spanning a plurality of years;
a search section of the server system (1) estimating an age of the item by identifying a change, at a position defined by the received positional information, occurring in two chronologically adjacent chronological maps of the plurality of chronological maps, and (2) finding, by using another change in two chronological maps of the plurality of chronological maps, a further item having an estimated age within a predetermined number of years of the estimated age of the item, wherein the further item is one of a building, a landmark, or a historically or culturally significant site;
a section of the server system generating a map including and marking the further item; and
a communication section of the server system transmitting the generated map for display.

2. The apparatus of claim 1 wherein the search section estimates the age of the further item by comparing patterns of roads at a base position defined by the positional information in the plurality of chronological maps to determine when a particular change occurred.

3. The apparatus of claim 1 wherein a location of the further item must be within a predetermined distance of the base position defined by the positional information.

4. The apparatus of claim 1 wherein the generated map further includes and marks a position of the item.

5. The apparatus of claim 1 wherein the plurality of chronological maps show patterns of roads.

6. The apparatus of claim 1 wherein the plurality of chronological maps show patterns of roads over a period of at least ten years.

7. The apparatus of claim 1 wherein the positional information is associated with a subject image sourced from a user device.

8. A computer-implemented method comprising:
receiving, with a server system, positional information about an item, wherein the item is one of a building, a landmark, or a historically or culturally significant site;
estimating, with the server system, an age of the item by identifying a change, at a position defined by the received positional information, occurring in two chronologically adjacent chronological maps of a plurality of chronological maps, wherein each of the plurality of chronological maps is associated with a time such that the plurality of chronological maps is collectively associated with a time period spanning a plurality of years;
searching, with the server system and by using another change in two chronological maps of the plurality of chronological maps, for a further item having an estimated age within a predetermined number of years of the estimated age of the item, wherein the further item is one of a building, a landmark, or a historically or culturally significant site; and
generating, with the server system, a map including and marking the further item.

9. The computer-implemented method of claim 8 wherein the act of searching estimates the age of the further item by comparing patterns of roads at a base position defined by the positional information in the plurality of chronological maps to determine when a particular change occurred.

10. The computer-implemented method of claim 8 wherein a location of the further item must be within a predetermined distance of the base position defined by the positional information.

11. The computer-implemented method of claim 8 wherein the generated map further includes and marks a position of the item.

12. The computer-implemented method of claim 8 wherein the plurality of chronological maps show patterns of roads.

13. The computer-implemented method of claim 8 wherein the plurality of chronological maps show patterns of roads over a period of at least ten years.

14. The computer-implemented method of claim 8 wherein the information about the item includes positional information associated with a subject image sourced from a user device.

15. A mobile information device comprising:
a communication section of the mobile information device for (1) sending positional information about an item to a server system, wherein the item is one of a building, a landmark, or a historically or culturally significant site and (2) receiving map information of a further item from the server, wherein the further item is one of a building, a landmark, or a historically or culturally significant site; and
a display section of the mobile information device for displaying a map using the map information received,
wherein the further item has an estimated age within a predetermined number of years of an estimated age of the item,
wherein the server system,
estimates an age of the item by identifying a change, at a position defined by the positional information, occurring in two chronologically adjacent chronological maps of a plurality of chronological maps, wherein each of the plurality of chronological maps is associated with a time such that the plurality of chronological maps is collectively associated with a time period spanning a plurality of years, and
finds, using another change in two chronological maps of the plurality of chronological maps, for the further item having an estimated age within a predetermined number of years of the estimated age of the item, and
wherein the map includes and marks the further item.

16. The apparatus of claim 1 wherein the plurality of chronological maps span at least ten years.

17. The computer-implemented method of claim 8 wherein the plurality of chronological maps span at least ten years.

18. The mobile information device of claim 15 wherein the plurality of chronological maps span at least ten years.

* * * * *